US008180826B2

(12) United States Patent
Hua et al.

(10) Patent No.: US 8,180,826 B2
(45) Date of Patent: May 15, 2012

(54) MEDIA SHARING AND AUTHORING ON THE WEB

(75) Inventors: Xian-Sheng Hua, Beijing (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 11/279,793

(22) Filed: Apr. 14, 2006

(65) Prior Publication Data

US 2007/0101387 A1    May 3, 2007

Related U.S. Application Data

(60) Provisional application No. 60/731,780, filed on Oct. 31, 2005.

(51) Int. Cl.
G06F 15/16 (2006.01)
(52) U.S. Cl. .................. 709/203; 709/201; 709/202
(58) Field of Classification Search .................. 709/203, 709/230, 231, 202, 201
See application file for complete search history.

(56) References Cited

U.S. PATENT DOCUMENTS

| 5,333,091 A | 7/1994 | Iggulden et al. |
|---|---|---|
| 5,442,633 A | 8/1995 | Perkins et al. |
| 5,497,430 A | 3/1996 | Sadovnik et al. |
| 5,530,963 A | 6/1996 | Moore et al. |
| 5,625,877 A | 4/1997 | Dunn et al. |
| 5,642,294 A | 6/1997 | Taniguchi et al. |
| 5,659,685 A | 8/1997 | Williams et al. |
| 5,710,560 A | 1/1998 | Cohn |
| 5,745,190 A | 4/1998 | Ioka |
| 5,751,378 A | 5/1998 | Chen et al. |
| 5,774,593 A | 6/1998 | Zick et al. |
| 5,778,137 A | 7/1998 | Nielsen et al. |
| 5,801,765 A | 9/1998 | Gotoh et al. |
| 5,821,945 A | 10/1998 | Yeo et al. |
| 5,835,163 A | 11/1998 | Liou et al. |
| 5,884,056 A | 3/1999 | Steele |
| 5,900,919 A | 5/1999 | Chen et al. |
| 5,901,245 A | 5/1999 | Warnick et al. |
| 5,911,008 A | 6/1999 | Niikura et al. |
| 5,920,360 A | 7/1999 | Coleman, Jr. |
| 5,952,993 A | 9/1999 | Matsuda et al. |
| 5,956,026 A | 9/1999 | Ratakonda |
| 5,959,697 A | 9/1999 | Coleman, Jr. |

(Continued)

FOREIGN PATENT DOCUMENTS

EP    0597450    5/1994

(Continued)

OTHER PUBLICATIONS

Bennett, et al., "Proscenium: A Framework for Spatio-Temporal Video Editing", ACM, 2003, pp. 8.

(Continued)

Primary Examiner — Jeffrey Pwu
Assistant Examiner — Shripal Khajuria
(74) Attorney, Agent, or Firm — Lee & Hayes, PLLC

(57) ABSTRACT

Exemplary media browsing, searching and authoring tools allow for media interaction over a web. An exemplary method includes acquiring digital video data, coding the digital video data using scalable video coding to generate scalable coded digital video data, analyzing the scalable coded digital video data using one or more video filters to generate information pertaining to the scalable coded digital video data and providing web access to the information. Various other exemplary technologies are disclosed.

17 Claims, 7 Drawing Sheets

U.S. PATENT DOCUMENTS

| | | | |
|---|---|---|---|
| 5,966,126 A * | 10/1999 | Szabo | 715/762 |
| 5,983,273 A | 11/1999 | White et al. | |
| 5,990,980 A | 11/1999 | Golin | |
| 5,995,095 A | 11/1999 | Ratakonda | |
| 6,020,901 A | 2/2000 | Lavelle et al. | |
| 6,047,085 A | 4/2000 | Sato et al. | |
| 6,072,496 A | 6/2000 | Guenter et al. | |
| 6,100,941 A | 8/2000 | Dimitrova et al. | |
| 6,166,735 A | 12/2000 | Dom et al. | |
| 6,182,133 B1 | 1/2001 | Horvitz | |
| 6,232,974 B1 | 5/2001 | Horvitz et al. | |
| 6,236,395 B1 | 5/2001 | Sezan et al. | |
| 6,282,317 B1 | 8/2001 | Luo et al. | |
| 6,292,589 B1 | 9/2001 | Chow et al. | |
| 6,298,145 B1 | 10/2001 | Zhang et al. | |
| 6,307,550 B1 | 10/2001 | Chen et al. | |
| 6,332,163 B1 | 12/2001 | Bowman-Amuah | |
| 6,353,824 B1 | 3/2002 | Boguraev et al. | |
| 6,389,168 B2 | 5/2002 | Altunbasak et al. | |
| 6,404,925 B1 | 6/2002 | Foote et al. | |
| 6,408,128 B1 | 6/2002 | Abecassis | |
| 6,421,675 B1 | 7/2002 | Ryan et al. | |
| 6,449,251 B1 | 9/2002 | Awadallah et al. | |
| 6,462,754 B1 | 10/2002 | Chakraborty et al. | |
| 6,466,702 B1 | 10/2002 | Atkins et al. | |
| 6,473,778 B1 | 10/2002 | Gibbon | |
| 6,516,090 B1 | 2/2003 | Lennon et al. | |
| 6,581,096 B1 * | 6/2003 | Cottrille et al. | 709/223 |
| 6,616,700 B1 | 9/2003 | Thum et al. | |
| 6,622,134 B1 | 9/2003 | Sorkin | |
| 6,631,403 B1 | 10/2003 | Deutsch et al. | |
| 6,643,643 B1 | 11/2003 | Lee et al. | |
| 6,643,665 B2 | 11/2003 | Kimbell et al. | |
| 6,658,059 B1 | 12/2003 | Iu et al. | |
| 6,661,468 B2 | 12/2003 | Alten et al. | |
| 6,670,963 B2 | 12/2003 | Osberger | |
| 6,711,587 B1 | 3/2004 | Dufaux | |
| 6,714,909 B1 | 3/2004 | Gibbon et al. | |
| 6,721,454 B1 | 4/2004 | Qian et al. | |
| 6,773,778 B2 | 8/2004 | Onozawa et al. | |
| 6,792,144 B1 | 9/2004 | Yan et al. | |
| 6,807,361 B1 | 10/2004 | Girgensohn et al. | |
| 6,870,956 B2 | 3/2005 | Qi et al. | |
| 6,934,415 B2 | 8/2005 | Stentiford | |
| 6,938,268 B1 | 8/2005 | Hodge | |
| 6,956,573 B1 | 10/2005 | Bergen et al. | |
| 7,006,091 B2 | 2/2006 | Masera et al. | |
| 7,055,166 B1 | 5/2006 | Logan et al. | |
| 7,062,705 B1 * | 6/2006 | Kirkwood et al. | 715/205 |
| 7,065,707 B2 | 6/2006 | Chen et al. | |
| 7,069,310 B1 | 6/2006 | Bartholomew | |
| 7,072,984 B1 | 7/2006 | Polonsky et al. | |
| 7,095,907 B1 | 8/2006 | Berkner et al. | |
| 7,116,716 B2 | 10/2006 | Ma et al. | |
| 7,248,294 B2 | 7/2007 | Slatter | |
| 7,296,168 B2 | 11/2007 | Edwards | |
| 7,325,199 B1 | 1/2008 | Reid | |
| 7,356,464 B2 | 4/2008 | Stella et al. | |
| 7,546,544 B1 | 6/2009 | Weber et al. | |
| 7,603,626 B2 | 10/2009 | Williams et al. | |
| 7,639,882 B2 | 12/2009 | Itakura | |
| 7,826,709 B2 | 11/2010 | Moriya et al. | |
| 2001/0023450 A1 | 9/2001 | Chu | |
| 2001/0047355 A1 | 11/2001 | Anwar | |
| 2002/0037159 A1 | 3/2002 | Goto et al. | |
| 2002/0067376 A1 | 6/2002 | Martin et al. | |
| 2002/0069218 A1 | 6/2002 | Sull et al. | |
| 2002/0073218 A1 | 6/2002 | Aspromonte et al. | |
| 2002/0100052 A1 | 7/2002 | Daniels | |
| 2002/0116533 A1 | 8/2002 | Holliman et al. | |
| 2002/0154833 A1 | 10/2002 | Koch et al. | |
| 2002/0157116 A1 | 10/2002 | Jasinschi | |
| 2002/0166123 A1 | 11/2002 | Schrader et al. | |
| 2002/0191861 A1 | 12/2002 | Cheatle | |
| 2003/0033347 A1 | 2/2003 | Bolle et al. | |
| 2003/0115607 A1 | 6/2003 | Morioka et al. | |
| 2003/0123850 A1 | 7/2003 | Jun et al. | |
| 2003/0152363 A1 | 8/2003 | Jeannin et al. | |
| 2003/0195863 A1 | 10/2003 | Marsh | |
| 2003/0206656 A1 | 11/2003 | Schwartz et al. | |
| 2003/0210886 A1 | 11/2003 | Li et al. | |
| 2003/0237053 A1 | 12/2003 | Chen et al. | |
| 2004/0001106 A1 | 1/2004 | Deutscher et al. | |
| 2004/0039810 A1 | 2/2004 | Donescu et al. | |
| 2004/0040041 A1 | 2/2004 | Crawford | |
| 2004/0068481 A1 | 4/2004 | Seshadri et al. | |
| 2004/0071083 A1 | 4/2004 | Li et al. | |
| 2004/0078357 A1 | 4/2004 | LaChapelle et al. | |
| 2004/0078382 A1 | 4/2004 | Mercer et al. | |
| 2004/0078383 A1 | 4/2004 | Mercer et al. | |
| 2004/0085341 A1 | 5/2004 | Hua et al. | |
| 2004/0088726 A1 | 5/2004 | Ma et al. | |
| 2004/0125877 A1 | 7/2004 | Chang et al. | |
| 2004/0128317 A1 | 7/2004 | Sull et al. | |
| 2004/0165784 A1 | 8/2004 | Xie et al. | |
| 2004/0184776 A1 | 9/2004 | Inoue et al. | |
| 2004/0236863 A1 | 11/2004 | Shen et al. | |
| 2004/0267952 A1 | 12/2004 | He et al. | |
| 2005/0069225 A1 | 3/2005 | Schneider et al. | |
| 2005/0084232 A1 | 4/2005 | Herberger et al. | |
| 2005/0114784 A1 | 5/2005 | Spring et al. | |
| 2005/0162556 A1 | 7/2005 | Desai | |
| 2005/0169312 A1 | 8/2005 | Cakareski et al. | |
| 2005/0175001 A1 | 8/2005 | Becker Hof et al. | |
| 2005/0192987 A1 | 9/2005 | Marsh | |
| 2005/0207442 A1 | 9/2005 | Zoest et al. | |
| 2005/0257151 A1 | 11/2005 | Wu | |
| 2005/0262439 A1 | 11/2005 | Cameron | |
| 2006/0023748 A1 | 2/2006 | Chandhok et al. | |
| 2006/0026528 A1 | 2/2006 | Paulsen et al. | |
| 2006/0036759 A1 | 2/2006 | Shen et al. | |
| 2006/0074754 A1 * | 4/2006 | Toyohara et al. | 705/14 |
| 2006/0107209 A1 | 5/2006 | Chen et al. | |
| 2006/0123053 A1 | 6/2006 | Scannell, Jr. | |
| 2006/0190435 A1 | 8/2006 | Heidloff et al. | |
| 2006/0190615 A1 | 8/2006 | Panwar et al. | |
| 2006/0200442 A1 | 9/2006 | Parikh | |
| 2006/0239644 A1 | 10/2006 | Barbieri | |
| 2007/0027754 A1 | 2/2007 | Collins et al. | |
| 2007/0060099 A1 | 3/2007 | Ramer et al. | |
| 2007/0201558 A1 | 8/2007 | Xu et al. | |
| 2008/0065751 A1 | 3/2008 | Hampson | |

FOREIGN PATENT DOCUMENTS

| | | |
|---|---|---|
| EP | 1168840 | 1/2002 |
| EP | 1213915 | 6/2002 |
| EP | 1478181 A1 | 11/2004 |
| GB | 2356080 | 5/2001 |
| JP | 2000516435 | 12/2000 |
| JP | 2001184802 A | 7/2001 |
| JP | 2002125199 A | 4/2002 |
| JP | 2002223412 | 8/2002 |
| JP | 2002238027 | 8/2002 |
| KR | 20020009089 A | 2/2002 |
| KR | 20040042449 A | 5/2004 |
| WO | WO0028467 A1 | 5/2000 |

OTHER PUBLICATIONS

Girgensogn, et al., "A Semi-automatic Approach to Home Video Editing", UIST 2000, San Diego, CA, 9 pages.

Adams, et al., "Seeded Region Growing", IEEE, vol. 16, No. 6, 1994, pp. 641-648.

Alexander, et al., "Informedia: News-on-Demand Multimedia Information Acquisition and Retrieval", 1997, pp. 1-21.

DeMenthon, et al., "Video Summarization by Curve Simplification", ACM, 1998, pp. 211-218.

Gong, et al., "Creating Motion Video Summaries with Partial Audio-Visual Alignment", IEEE, 2002, pp. 285-288.

Bennett, et al., "Proscenium: A Framework for Spatio-Temporal Video Editing", Nov. 2-8, 2003, 8 pages.

Fan et al, "Visual Attention Based Image Browing on Mobile Devices", IEEE, Jul. 6-9, 2003, pp. 1-4.

U.S. Appl. No. 10/179,161, filed Jun. 24, 2002 inventors Jin-Lin Chen & Wei-Ping Ma entitled "Function-based Object MOdel for Web Page Display in a Mobile Device".

U.S. Appl. No. 10/285,933, filed Nov. 1, 2002 inventors Yu-Fei Ma et al. entitled "Systems and Methods for Generating a Motion Attention Mode".

U.S. Appl. No. 10/286,053, filed Nov. 1, 2002 inventors Yu-Fei Ma et al. entitled "Systems and Methods for Generating a Comprehensive User Attention Model".

U.S. Appl. No. 10/286,348, filed Nov. 1, 2002 inventors Xian-Sheng Hua et al. entitled "Systems and Methods for Automatically Editing a Video".

U.S. Appl. No. 10/371,125, filed Feb. 20 2003 Inventors Wei-Ying Ma et al. Entitled "Systems and Methods for Enhanced Image Adaptation".

"Advanced Digital Video Storage and On-line Retrieval System", Advisor Project, Jun. 30, 2002, retrieved from the Internet: http://advisor matrasi-tts.fr/DUP_workshop_sheet.pdf.

Ahmad, "VISIT: A Neural Model of Covert Visual Attention" Advances in Neural Information Processing Systems v. 4 1991 pp. 420-427.

Baluja et al., "Expectation-Based Selective Attention for Visual Monitoring and Control of a Robot Vehicle" Robotics and Autonomous System v. 22 No. 3-4 Dec. 1997 pp. 329-344.

Bertini et al., "Indexing for Resue of TV News Shots" Pattern Recognition, Elsevier, Kidlington, GB, vol. 35, No. 3, Mar. 2002, pp. 581-591.

Chen et al., "A Visual Attention Model for Adapting Images on Small Displays" ACM Multimedia Systems Journal 2003.

Chen et al., "Function-based Object Model Towards Website Adaptation" (2001) Proc. of the 10th Int. wWW Conf. pp. 1-21.

Cherry, "Pesky Home Networks Trouble cable Behemoths" IEEE Spectrum Apr. 2002 pp. 60-61.

Christopoulos et al., "The JPEG2000 Still Image Coding System: An Overview" IEEE Transactions on Consumer Electronics vol. 46 No. 4 pp. 1103-1127 Nov. 2000.

Deng et al., "Peer Group Filtering and Perceptual Color Image Quantization" Proceedings of IEEE International Symposium on Circuits and systems vol. 4 1999 pp. 21-24.

Divakaran et al., "Video Summarization Using Descriptors of Motion Activity: A Motion Activity based approach to Key-Frame Extraction from Video Shots" Journal of Electronic Imaging Oct. 2001 vol. 10 n 4 pp. 909-916.

Gamaz et al., "Robust scene-change detection in MPEG compressed domain" Elec & Comp. Eng. pp. 95-99 1998.

Goncalves, "Towards a Learning Model for Feature Integration in Attention Control", retrieved on Jul. 19, 2006 at <<http://ieeexplore.ieee.org/search/srchabstract.jsp?arnumber=1013553 &isnumber=21824&pun>>, International Conference on Multisensor Fusion and Integration for Intelligent Systems, Aug. 20-22, 2001, pp. 311-316.

Gu et al., "Dissolve detection in MPEG compressed video" IEEE pp. 1692-1696 1997.

Hargrove et al., "Logo Detection in Digital Video" Math 100 Mar. 6, 2001 http://toonarchive.com/logo-detection/ 9 pages.

Held, "Focus on Agere System's Orinoco PC Card" International Journal of Network Management Jan. 2002 pp. 187-193.

Heng et al., "Post shot boundary detection technique: Flashlight scene determination" University of Western Australia pp. 447-450 1999.

http://www.fatalfx.com/nomad/ "NOMAD (No More Advertising)" Feb. 17, 2003 4 pages.

Itti et al., A Comparison of Feature Combination Strategies for Saliceny-Based Visual Attention Systesm: Proc. of SPIE Human Vision and Electronic Imaging IV (HVEI'99) San Jose CA vol. 3644 pp. 473-482 Jan. 1999.

Itti et al., "A Model of Saliency-based Visual Attention for Rapid Scene Analysis" IEEE Trans. on Pattern Analysis and Machine Intelligence 1998 5 pages.

Itti et al., "Computational Modelling of Visual Attention" Nature Reviews/Neuroscience vol. 2 Mar. 2001 pp. 1-11.

Jha et al., "Wireless Landscape-Need for Seamless Connectivity" Wireless Personal Communications 2002 pp. 275-283.

Jing et al., "An Effective Region-Based Image Retrieval Framework" From ACM Multimedia 2002 28 pages.

Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.

Lee et al., "Perception-Based Image Transcoding for Universal Multimedia Access" School of Electrical Engineering Korea University Seoul Korea 2001 IEEE pp. 475-478.

Lelescu et al., "Real-time scene change detection on compressed multimedia bitstream based on statistical sequential analysis" IEEE pp. 1141-1144 2000.

Li et al., "Statistical Learning of Multi-View Face Detection" Proceedings of ECCV 2002 25 pages.

Lienhart, et al., "On the Detection and Recognition of Television Commercials" University of Mannheim 17 pages.

Lin et al., "Video Schene Extraction by Force Competition" IEEE Intl. Conference on Multimedia and Expo (ICME 001) Waseda University Tokyo Japan Aug. 22-25, 2001 4 pages.

Lu et al., "A Robust Audio Classification and Segmentation Method" Microsoft Research China 9 pages. International Multimedia Conference; vol. 9; Proceedings of the ninth ACM International Conference on Multimedia; Ottawa, Canada; 2001.

Lu et al., "Content Analysis for Audio Classification and Segmentation" IEEE Transactions on Speech and Audion Processing vol. 10 No. 7 Oct. 2002 pp. 504-516.

Lu et al., "Content-Based Audio Segmentation Using Support Vector Machines" 2001 IEEE pp. 956-959.

Ma et al., "A Model of Motion Attention for Video Skimming" Proceedings 2002 International Conference on Image Processing; vol. 1. 2002. Microsoft Research Asia 4 pages.

Ma et al., "A New Perceived Motion Based Shot Content Representation" Proceedings 2001 International Conference on Image Processing; Oct. 7, 2001-Oct. 10, 2001. Microsoft Research China 4 pages.

Ma et al., "A User Attention Model for Video Summarization" Proceedings of ICIP 2002.

Milanese et al., "Attentive Mechanisms for Dynamic and Static Scene Analysis" Optical Engineering v34 No. 8 Aug. 1995 pp. 2428-2434.

Niebur et al., "Computational Architectures for Attention" The Attentive Brain Chapter 9 1998 pp. 163-186.

O'Toole "An MPEG-1 shot boundary detector using XIL colour histograms" Dublin City University pp. 1-7 1998.

O'Toole et al., "Evaluation of Automatic Shot Boundary Detection on a Large Video Test Suite" School of Computer Applications & School of Electronic Engineering Dublin City University Glasnevin Dublin Ireland Challenge of Image Retrieval Newcastle 1999 pp. 1-12.

Osberger, et al., "An Automatic Image Quality Assessment Technique Incorporating Higher Level Perceptual Factors", retrieved on Jul. 19, 2006, at <<http://ieeexplore.ieee.org/search/srchabstract.jsp?arnumber727227&isnumber==15680&punu>>, International Conference on Image Processing, vol. 3, Oct. 4-7, 1998, pp. 414-418.

Sadlier, "Automatic TV Advertisement Detection from MPEG Bitstream" Centre for Ditial Video Processing/Research Institute for Network & Communication Eng. Dublin City University 12 pages.

Sahoo et al., "Threshold Selection Using a Minimal Histogram Entropy Difference" Optical Engineering v36 No. 7 Jul. 1997 pp. 1976-1981.

Sanchez et al., "AudiCom: a Video Analysis System for Auditing Commercial Broadcasts" Computer Vision Center Departament d'Informatica Universitat Autonoma de Barcelona 5 pages.

Smith et al., "Video Skimming and Characterization through the Combination of Image and Language Understanding Techniques" Proc. of Computer Vision and Pattern Recognition 1997 IEEE pp. 775-781.

Tsotsos et al., "Modeling Visual Attention Via Selective Tuning" Artificial Intelligence v78 1995 pp. 507-545.

Wolfe et al., "Deplying Visual Attention: The Guided Search Model" AI and the Eye Chapter 4 1990 pp. 79-103.

Yeo et al., "Rapid scene analysis on compressed video" IEEE pp. 533544 1995.

Yusoff et al., "Video shot cut detection using adaptive thresholding" University of Surrey pp. 1-10 2000.

Yusoff, et al., "Video shot cut detection using adaptive thresholding" University of Surrey pp. 1-10 2000.

Zabih, "A Feature-Based Algorithm for Detecting and Classifying Scene Breaks" Computer Science Department Cornell University 16 pages.

Zadeh, "Probability Measures of Fuzzy Events" Journal of Mathematical Analysis and Applications 23 1968 pp. 421-427.

Zhang et al., "A Hierarchical Organization Scheme for Video Data" Pattern Recognition, Elsevier, Kidlington, GB, vol. 35 No. 11, Nov. 2002, pp. 2381-2387.

Dufaux, "Key frame selection to represent a video", Proc. 2000 Int. Con. on Image Processing, vol. 2, Sep. 2000, pp. 275-278.

Rauschenbach, et al., "Demand-driven image transmission with levels of detail and regions of interest", Computers & Graphics, 1999, pp. 857-866.

Rauschenbach, et al., "Flexible Embedded Image Communication using Levels of Detail and Regions of Interest", Proc. IMC'98, 1998, pp. 1-10.

Beg, "User Feedback Based Enchancement in Web Search Quality", Elsevier Inc., 2004, pp. 20.

Degn, et al., "Peer Group Filtering and Perceptual Color Image Quantization", IEEE, 1999, pp. 8.

Kelly, et al., "Implicit Feedback for Inferring User Preference: A Bibliography", SIGIR Forum, vol. 37, No. 2, 2003, pp. 18-28.

"NOMAD (No More Advertising)", http://www.fatalfx.com/nomad/, Feb. 17, 2003 4 pages.

Pirolli, "Exploring Browser Design Trade-offs Using a Dynamical Model of Optimal Information Foraging", Proc. SIGHI Conference on Human factors in Computing Systems CHI, 1998, pp. 33-40.

Smith, et al., "Scalable Multimedia Delivery for Pervasive Computing", ACM, 1999, pp. 131-140.

Sugiyama, et al., "Adaptive Web Search Based on User s Implicit Preference", DEWS, 2004, pp. 8.

Vetro, et al., "Object-Based Transcoding for Adaptable Video Content Delivery", Transactions on Circuits and Systems for Video Technology, IEEE, vol. 11, No. 3, Mar. 2001, pp. 387-401.

Li, "PeerStreaming a Practical P2P Streaming System", Microsoft, Sep. 2004, 9 pgs.

Zhuang et al., "Adaptive Key Frame Extraction Using Unsupervised Clustering", Oct. 1998 in IEEE International Conference on Image Processing, vol. 1, pp. 866-870.

Wolf, "Key Frame Selection by Motion Analysis", Conf. Proceedings Acoustics, Speech, and Signal Processing, 1996 IEEE International Conference, May 1996, vol. 2, pp. 1228-1231.

Wang, "Design and Realization of User Model of Personalized Information Retrieval", Masteral Dissertation, Dalian University of Science and Technology, Dec. 15, 2004.

Padmanabhan et al., "Resilient Peer to Peer Streaming", <<http://eprints.kfupm.edu.sa/62381.pdf>>, pp. 1-17, Mar. 2003.

Ex parte Douglas K. Brubacher and Luciano Passuello, Board Patent Appeals and Interference, Jan. 22, 2009.

Uchihashi et al., "Video Manga: Generating Semantically Meaningful Video Summaries", In Proceedings of the Seventh ACM International Conference on Multimedia, Orland Florida, Oct. 30-Nov. 5, 1999, ACM, pp. 383-392.

Jiang et al., "GnuStream: A P2P Media Streaming System Prototype", 2003 International Conference on Multimedia and Expo, vol. 2, 5 pages.

The Japanese Office Action mailed Sep. 1, 2011 for Japanese patent application No. 2005-224585, a counterpart foreign application of US patent No. 7,986,372, 2 pages.

Office Action for U.S. Appl. No. 11/263,718, mailed on Sep. 8, 2011, Xian-Sheng Hua, "Template-Based Multimedia Authoring and Sharing ", 7 pgs.

Final Office Action for U.S. Appl. No. 10/900,923, mailed on Sep. 22, 2011, Aaron DeYonker, "Thumbnail Generation and Presentation for Recorded TV Programs", 21 pages.

Final Office Action for U.S. Appl. No. 11/278,487, mailed on Jun. 16, 2011, Yu-Fei Ma, "Generating a Motion Attention Model".

\* cited by examiner

MEDIA SHARING AND AUTHORING ON THE WEB

RELATED APPLICATIONS

This application claims priority to a US Provisional application having Ser. No. 60/731,780, entitled "Media Sharing and Authoring on the Web", filed Oct. 31, 2005, which is incorporated by reference herein. This application is related to US application having Ser. No. 10/286,348, entitled "Systems and Methods for Automatically Editing a Video", filed Nov. 1, 2002; US application having Ser. No. 11/254,843, entitled "Architecture for Scalable Video Coding Applications", filed Nov. 20, 2005; US application having Ser. No. 11/263,718, entitled "Template-Based Multimedia Authoring and Sharing", filed Nov. 1, 2005; US application having Ser. No. 11/275,400, entitled "Dynamic Search with Implicit User Intention Mining", filed Dec. 29, 2005; and US application having Ser. No. 11/263,081, entitled "Capture-intention Detection For Video Content Analysis", filed Oct. 31, 2005. All of these related applications are incorporated by reference herein.

BACKGROUND

Many consider search technology a key to navigating the Internet's growing media (video/audio/image) collections. Further, as media becomes available in different forms, types, quality, content, etc., a need arises for search capabilities to navigate and identify particular media. Yet further, to promote widespread distribution of content, technology should consider authoring capabilities that can facilitate such distribution as well as searching and browsing capabilities. Video presents, perhaps, the greatest challenge due to size/quality and codec concerns, not to mention video with accompanying audio. As described herein, various exemplary technologies address media (e.g., video, audio, image, etc.) authoring, sharing, searching and browsing needs and/or other needs.

SUMMARY

An exemplary system operates in conjunction with the Web, or other networked environment for media sharing and authoring. In an end-to-end implementation example, such a system includes various exemplary technologies for scalable video coding, multimedia content analysis, and template-based media authoring. A scalable video codec addresses data transmission concerns, multimedia content analysis features facilitate video editing and metadata generation (where desired), and template-based media authoring reduces workload of media sharing and authoring. Various examples are described herein as operating in conjunction with the Internet to demonstrate effectiveness of the exemplary system and various exemplary technologies.

Exemplary search and related technologies described herein can help in navigating the Internet's growing media (e.g., video, audio, image, etc.) collections or resources. Various exemplary technologies provide for efficient and scalable video authoring, browsing, and sharing of media on the Web.

DESCRIPTION OF THE DRAWINGS

Non-limiting and non-exhaustive examples are described with reference to the following figures.

DETAILED DESCRIPTION

Figure 1:
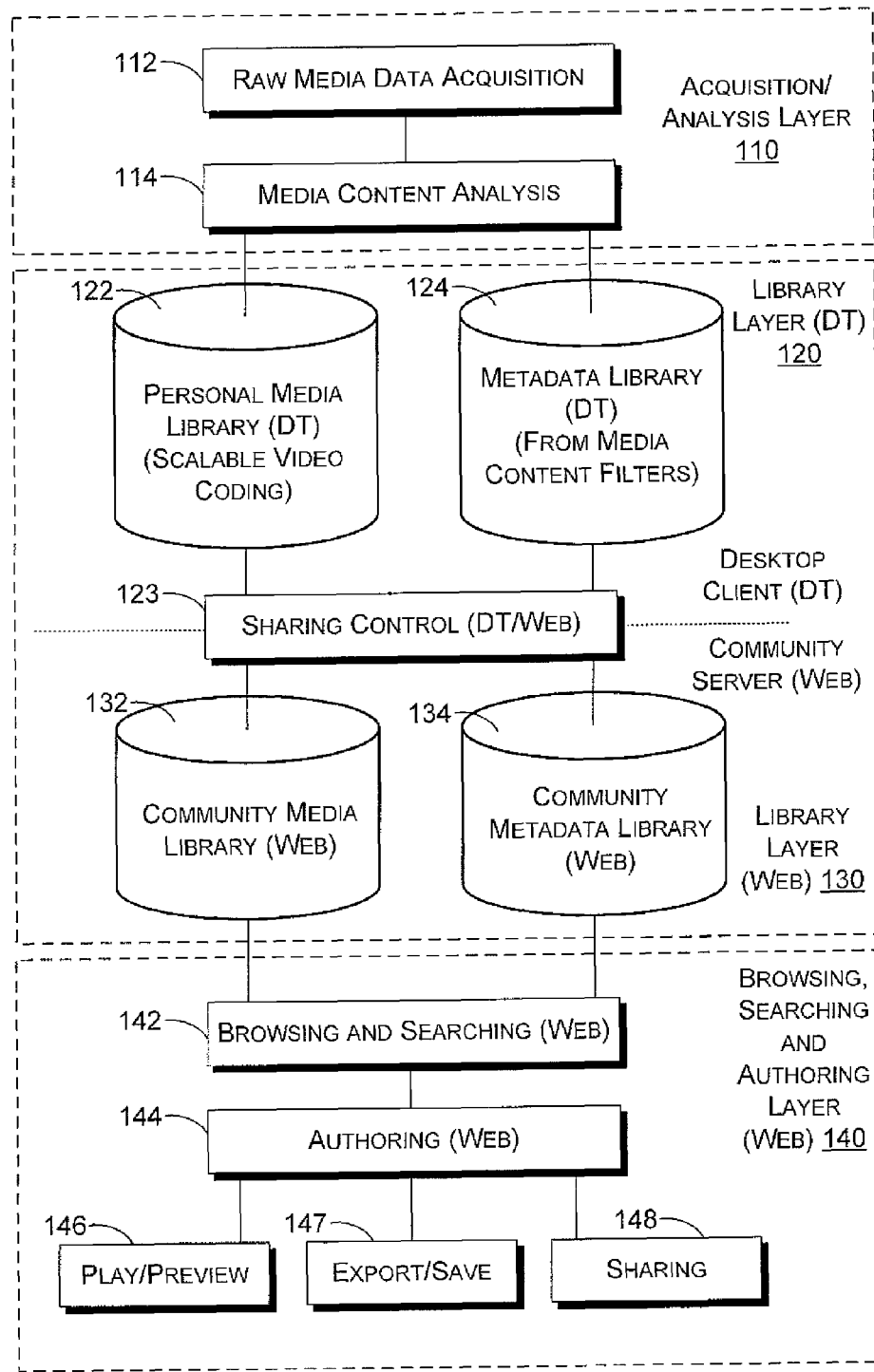
FIG. 1 is a block diagram of an exemplary system for acquisition, storage, browsing and authoring of media.

The description that follows includes the best mode currently contemplated. The technology described herein pertains generally to information interfaces and presentation of information, multimedia information systems (e.g., video, audio, etc.), artificial intelligence for vision and scene understanding (e.g., video analysis, etc.). Various exemplary technologies pertain to video editing, multimedia content analysis, multimedia sharing, multimedia management, and/or template-based video authoring. Various algorithms are disclosed that may be implemented through use of hardware and typically software.

Various exemplary technologies may be implemented through use of components in a computing environment such as a system of computers connected by one or more networks.

The recent introduction and rapid adoption of consumer digital photo cameras and video camcorders has redefined the landscape for media (photo and video) management, authoring/editing and sharing tools. Existing video editing tools can be roughly classified into two categories. One is high-end professional editing systems while he other is middle- or low-end editing tools.

While some flexibility and editing power exists with the first category of editing tools, users often require complex editing skills and aesthetic sense. At the same time, to learn such tools can require great effort on behalf of a user. Further, in using such tools, the task of video editing remains time-consuming and tedious.

With respect to the second category of editing tools, such tools can make the task of video editing much easier due to support for automatic video editing methods driven by intelligent multimedia content analysis technologies. Further, some automatic or semi-automatic editing methods are available.

With respect to examples of tools, a "suitability" tool provides for detection of suitable video media clips according to numerical "unsuitability" scores. Such a tool allows for organization of suitable clips by the users in a storyboard and also allows for automatic concatenation to produce a final video. In another example, an automatic music video generation tool provides for content selection based on calculation of video unsuitability relating to camera motion and image contrast. An automated home video editing scheme provides tools for dynamic highlighting of home video content by selecting desirable high-quality clips and linking them with transition effects and incidental music.

As an example of an automated video editing scheme, one or more tools allow for extraction of sub-shots from video and calculation of importance measures for at least a portion of the extracted sub-shots. A tool may then determine respective relative distributions for sub-shots having relatively higher importance measures as compared to importance measures of other sub-shots. In such an example, based on the determined relative distributions, sub-shots that do not exhibit a uniform distribution with respect to other sub-shots in the particular ones may be dropped while remaining sub-shots (e.g., connected by respective shot transitions) may be used to form a video summary. A tool may provide for addition of an independent music source (e.g., as incidental music), for example, by aligning the sub-shot boundaries with the music beats and matching sub-shot motion intensities with the music moods.

The size of media data, typically quite large, can hinder sharing of personal media. Authoring based sharing, i.e., sharing the authored (summarized) media, can significantly reduce the burden of data transmission; however, it is still far from being fully realized due to lack of suitable media authoring tools and sharing platforms.

Various exemplary technologies described herein can be arranged to create an exemplary web-based scheme or system for media authoring. Such an exemplary system can enable users to efficiently share and author personal media on the Web. As already mentioned, an exemplary system may include the following three component technologies scalable video coding, intelligent multimedia content analysis, and template-based media authoring.

As discussed herein, scalable video codec addresses data transmission, multimedia content analysis facilitates automatic video editing, and template-based media authoring reduces workload of media sharing and authoring. Web-based media authoring can provide a wider space for average users to share their media experiences, as well as a broader channel for users to obtain raw media materials for further applications.

With respect to scalable video coding, scalable code-streams allow for media content to be accessed using a number of different devices without separate codestreams having to be maintained or acquired for each type of device. An exemplary architecture allows a system to adaptively access scalable media codestreams both to promote efficient use of resources and to exploit scalable media codestreams to support a number of different applications. In such an example, minimum coding units from a codestream, such as macroblocks (e.g., to provide access to the content at a selected level) can be collected in packettes by a peer system or peer layer. Such packettes may be transmitted within conventional transport packets. Thus, the exemplary architecture allows for adaptive access to the scalable codestream that is transparent to both the application and transport layers on the systems exchanging the codestream. Such an architecture supports applications including allowing multiple devices to each receive content at a desired access level without exchanging the full codestream, content shifting between devices to facilitate device roaming, and access level shifting to accommodate changes in available storage or other capabilities.

Various sections (2 through 7) appear below. Briefly, Section 2 introduces the architecture of an exemplary web-based editing system. Pre-processing operations applied at a client are presented in Section 3, followed by those able to be performed on a community server in Section 4. In Section 5, a demonstration example is presented of various techniques to accomplish authoring on the web as well as authoring templates. Section 6 presents various exemplary technologies and Section 7 pertains to an exemplary computing environment suitable for use in implementing various exemplary components and in forming an exemplary system.

Section 2: An Exemplary System

FIG. 1 shows an exemplary system 100 that includes various layers: an acquisition and/or analysis layer 110; a library desktop layer 120; a library web layer 130; and a browsing, searching and authoring layer 140. Also included is a sharing control 123 that provides for communication of information between the library desktop layer 120 and the library web layer 130. These layers may include one or more associated modules. For example, as shown, the layer 110 includes an acquisition module 112 for raw media data acquisition and an analysis module 114 for media content analysis. The browsing, search and authoring layer 140 includes a browsing and search module 142, an authoring module 144 and one or more command modules such as a play/preview module 146, an export/save module 147 and a sharing module 148. Various modules may operate as interfaces between layers or within a layer.

The library desktop layer 120 includes a personal media library 122 for media such as video media coded using scalable video coding and a metadata library 124, which can store metadata associated with media content, such as metadata from media content filters. The library web layer 130 includes a community media library 132 for media such as video media, optionally amenable to scalable video coding, and a community metadata library 134. The control module or interface 123 allows for communication or transfer of information between one or more libraries, for example, between desktop client libraries and community server libraries.

A user or users may use a module (e.g., module 112) associated with a desktop client to import media data into a desktop client where the media data includes video data encoded by a scalable video codec. A content analysis module (e.g., module 114) that includes analysis algorithms may then be applied to the media data. A module may construct a personal media library (e.g., library 122) and a metadata library (e.g., library 124) on the desktop client or access one or more existing desktop client libraries to store the media data.

A sharing control (e.g., control 123) associated with the desktop client can then allow a use or users to share all or part of the metadata, as well as all or part of the media data in a predetermined quality (e.g., low-quality in terms of low-resolution, low frame-rate, and/or high compression ratio) on the server. For example, the control 123 may upload such information to a community web layer 130 (e.g., including one or more servers). A sharing module may allow a user or users to control sharing permissions both on the desktop client and the web (e.g., community web) through a uniform administration interface.

In the example of FIG. 1, a community web server maintains the community media library 132 and metadata library 134. Typically, such a metadata library covers more media data, and also may link to one or more media database in individual users' computers, for example, under appropriate permission controls.

In the system 100 of FIG. 1, on the server side, one or more web-based applications provide capabilities for web browsing, searching and authoring (e.g., the modules 142, 144). In one implementation, authored results may be played (previewed) on the web with low resolution and/or low frame rate, while higher quality media (e.g., depending on a user's sharing control) may be created if the user can get data streaming permission from the data owner(s). Created content, which may encompass various types of data (e.g., not necessary limited to real media data; could be a small-size description file) may also be shared on one or more community servers.

Section 3: Exemplary Pre-Processing on a Client

Various media data pre-processing techniques can occur on a client prior to authoring and sharing such data on a community server. In a particular example, scalable coding, content analysis and metadata sharing provide for pre-processing personal media data before authoring and sharing on the web.

Figure 2:
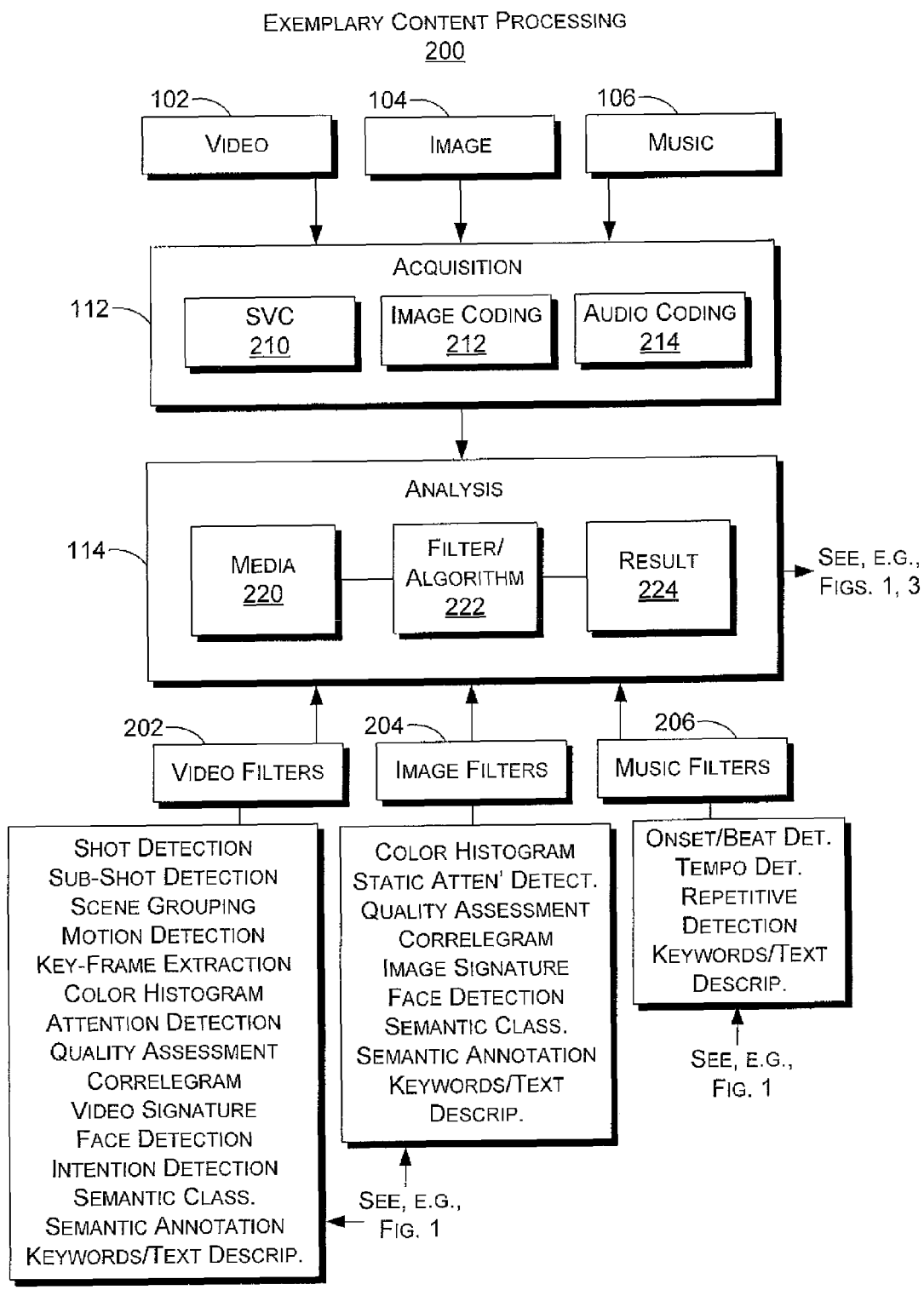
FIG. 2 is a block diagram of an exemplary content analysis procedure along with various filters suitable for use in such an analysis.

FIG. 2 shows exemplary content processing techniques 200 that include coding techniques associated with an acquisition module 112 and filtering techniques associated with an analysis module 114. The acquisition module 112 may acquire various types of media, for example, video 102, image 104 and music 106. With respect to coding, a specific example involves scalable video coding (SVC), as provided in a SVC block 210.

3.1 Exemplary Scalable Media Coding

SVC is one of the bases of the web-based media sharing and authoring system 100. A suitable scalable video coding mechanism provides for efficient, scalable and robust streaming video system, for example, over IP, wireless networks, etc., including the Internet.

An exemplary SVC mechanism applies multiple-loop prediction and drifting reduction techniques at a macroblock level, which allows the mechanism to outperform MPEG-4 FGS up to 3.0 dB. The exemplary mechanism provides for network bandwidth and device adaptation via embedded enhancement bitstreams and the universal scalabilities. Such an exemplary mechanism, with a bandwidth estimation method, can rapidly and stably catch bandwidth variations. Further, an exemplary SVC mechanism provides a layered bitstream structure with a more important base layer and less important enhancement layers, which allows for a highly protected base layer bitstream through error resilience and unequal error protection techniques that can be implemented with little overhead. An exemplary SVC mechanism allows for presentation of video, to a user or users, with a smoother playback experience and better visual quality on the Internet.

3.2 Exemplary Preliminary Content Analysis

An exemplary analysis module 114 can be a base component of the system 100. The analysis module 114 provides for analysis of media content 220 such as video, image and music content. As shown in FIG. 2, the analysis module 114 operates on media 220 using one or more filters or algorithms 222 to produce a result 224. An extensible and open media content analysis module allows for adoption of future content algorithms. Content analysis tools can provide for an ability to obtain more compelling authoring results with less effort.

Media content analysis algorithms are often regarded as content filters. The exemplary content processing 200 of FIG. 2 shows a video filters block 202, an image filters block 204 and a music or audio filters block 206. Various examples are also shown as being available to the blocks 202, 204, 206.

With respect to such filters or algorithms, a shot detection filter may be used as a video filter for shot detection, a histogram extraction filter may be used as an image filter and applied for generation of a color histogram, etc. A content filter may be an online filter or an offline filter. Online filters require parsing the entire video or audio stream, or photo files, to extract the corresponding basic metadata from the stream. While offline filters extract higher level metadata directly from these basic metadata without parsing the original media data. Examples of online filters include shot detection, timestamp extraction, and histogram extraction filters. Offline filters include scene detection, quality assessment filters.

As already mentioned, the analysis module 114 can apply one or more filters/algorithms 222 to media 220 to produce a result 224 (e.g., information), which may be metadata. The analysis module 114 may produce the result 224 in a particular format. For example, an exemplary analysis module component optionally uses a mark-up language such as an extensible mark-up language (e.g., XML, etc.) to store all extracted or generated metadata. In this example, if new metadata needs be extracted or generated, an exemplary component may be used to write a new filter, for example, based on a filter template (e.g., a base C++ class, etc.), and then plug it into the analysis module 114. An exemplary analysis module may allow advanced users to inherit a predefined online or offline base class, and then implement the real metadata extraction functions.

With respect to video filters 202, a shot detection filter may include several feature extraction filters such as key-frame selection filter, quantized color histogram filter, ordinal measure based signature filter, correlegram filter, face detection filter, attention detection filter, camera/object motion filter, intention detector, semantic classification/annotation filter, and text/keywords description which may be added by the content creators or viewers.

With respect to "intent" filters, often, a user may have to try multiple search keywords related to a searching target, and/or multiple search iterations, to get a reasonably relevant result—especially when searching for multimedia content such as images. An exemplary scheme may use an intention mining module which collects formation from a user's reactions to search results and/or from other data regarding the user which can be mined from a computer, to refine a search. For example, an intention mining module may refine searches via execution of instructions that examine how a user interacts with search terms. In this example, results may be presented and a second revised search performed based on user interaction with the results. In general, intention based searching aims to perform or refine a search based on mining user's interests and behaviors.

Another approach uses a model that can segment home videos into temporal scenes, shots, and sub-shots. By deriving visual features from the sub-shots, the model can automatically categorize the intention of the person filming. Thus, in such a manner, home videos can be indexed by whether the person was trying to shoot beautiful scenery, a close up, an action shot, etc.

With respect to image filters 204 (e.g., photos filters, etc.), various video filters can often be used, with exception of video specific filters like shot detection, key-frame extraction and motion detection filters. With respect to music or audio filters, filters such as onset/beat, tempo detection and repetitive pattern detection filters may be supported.

As described herein, content filters (e.g., and data, including metadata, extracted by these filters) can be applied by various content-based automatic editing methods. In addition, such data can also facilitate a user's ability to find appropriate raw media segments when doing authoring (see Section 4).

3.3 Exemplary Metadata and Media Data Sharing

An exemplary system component allows for extraction of metadata on a desktop client to be uploaded to a server (e.g., a community server) and shared to other users (e.g., users in the community). Such an arrangement allows for searching on the web based at least in part on such metadata. Such metadata are optionally linked to the original media data on an individual's PC through a P2P network, as well as the quality-constrained version of the media data that may be shared on a community server.

In an exemplary system, users are not only able to control which part of the video or photo collection are shared to which user or which group of users, but also able to control the quality (compression ratio, resolution, and frame rate) that a particular user or user group may obtained from the server or P2P network.

Figure 3:
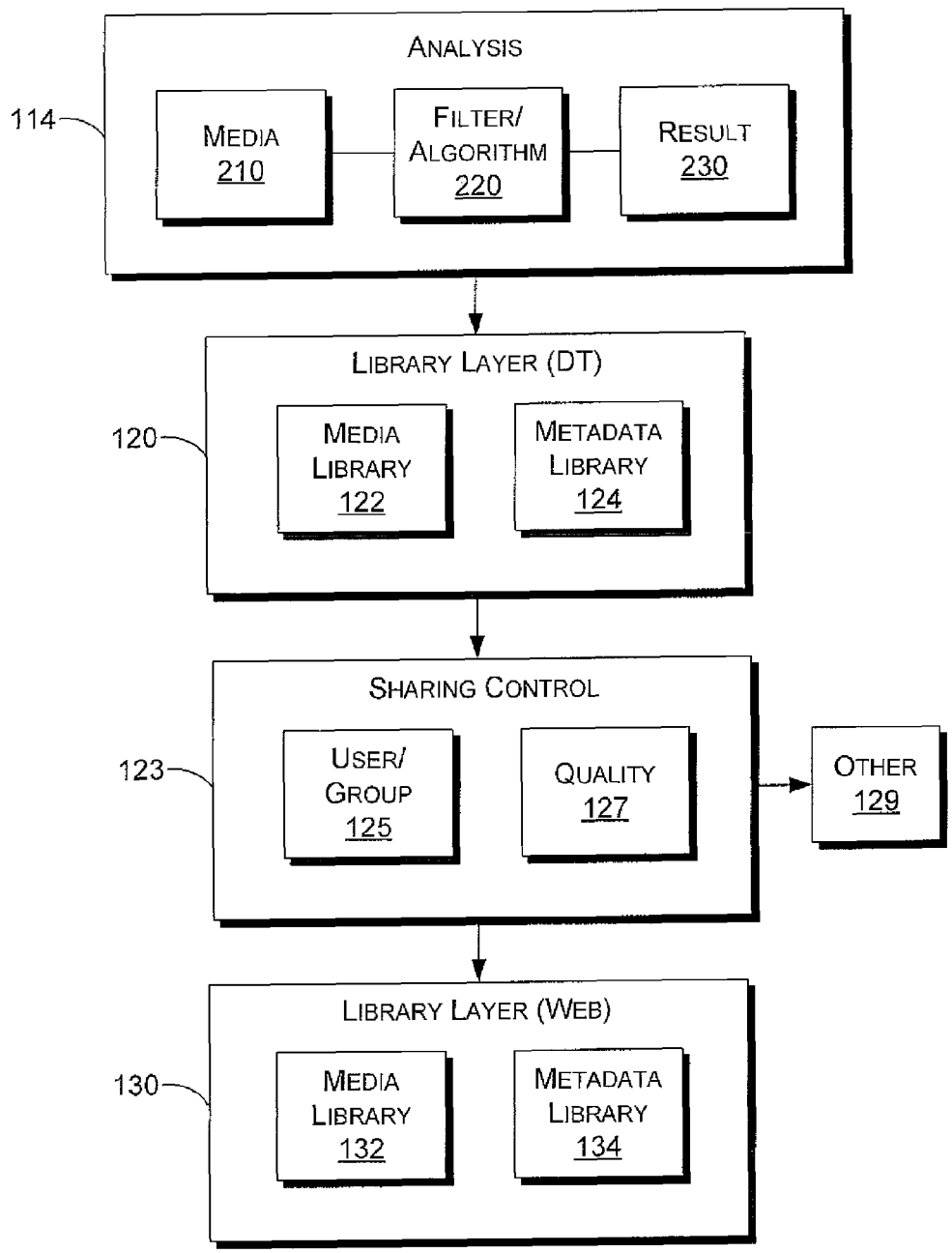
FIG. 3 is a block diagram of an exemplary metadata and media sharing procedure.

FIG. 3 shows an exemplary metadata and media sharing method that includes use of various components of the exemplary system 100 of FIG. 1. As already described, an analysis module 114 (e.g., associated with a desktop client) can extract or generate information 230 (e.g., metadata) from media data 210 (e.g., media file(s)) using one or more filters 220 (e.g., filters/algorithms). Such information 230 is optionally formatted in a mark-up language (e.g., XML, etc.).

The resulting information 230 may be provided to a desktop layer 120 for storage in one or more libraries 122, 124 or for association with such a layer. A control module 123 includes various modules, such as, but not limited to, a permissions module 125 for setting user and/or group permissions (e.g., access, use, types of use, modifications, etc.) and a quality module 127 that controls quality parameters, optionally based in part on bandwidth, user capabilities, client machine capabilities, permissions, etc. In this example, the control module 123 operates as an interface between the library desktop layer 120 and the library web layer 130 (e.g., a community server layer) and optionally one or more other layers, users or groups 129. Service features associated with a server such as a community server are discussed below.

Section 4: Service on a Server (e.g., a Community Server)

As already mentioned, an exemplary system may operate in conjunction with one or more servers. Such a server may be a community server that serves one or more communities (e.g., data sharing communities, etc.). Functionalities provided on a community web server can include metadata (and part of raw media data) storing, indexing and searching and providing a user interface (UI) for community users to accomplish authoring and sharing on a web (e.g., the Web, the Internet).

4.1: Searching Browsing and Rating

On the server side (e.g., media sharing community side), metadata can be stored in a well-structured database which enables fast searching and browsing by, for example, a browsing module (e.g., the module 142 of FIG. 1) that can implement one or more of the following techniques:

By keywords (e.g., input by the content owners and/or comments from other viewers in the community);

By semantic classes (e.g., such as indoor, outdoor, cityscape, landscape, beach, sea, mountain and people);

By intention categories (e.g., such as beautiful scenery, dynamic event, static capturing, and close-up view);

By camera motion type and object motion quality (e.g., such as "zooming in", "high motion", and "mild motion");

By dominant colors (e.g., such as blue, green, and red);

By perceived quality measures (e.g., such as visual quality, motion quality, compression ratio, frame-rate and resolution);

By rating (e.g., as constructed by the users in the community who viewed this data); and By similar or related media data (video clips/photos) of the focused or selected media data can also be provided when doing searching and browsing. When doing browsing, an interface typically provided to the user to do rating and commenting.

4.2: Web Authoring UI

An exemplary Web authoring UI is designed as a form like a wizard, which can allow for execution of various steps that a user can easily follow. The exemplary system 100 of FIG. 1 includes an authoring module 144 that may provide such a UI and associated features such as templates, etc.

In an exemplary method, a first step includes selecting an authoring template. The template candidates may be designed by common users or commercial organizations. A server may provide a set of predefined templates, while the users may also design, modify or upload their own templates. These templates significantly simplify the process of media authoring on the web.

With respect to authoring templates, template-based multimedia authoring may provide for analysis of media content analysis and allow for selective application of content-aware two-layer authoring templates (e.g., content description templates and content representation templates) to extract media content. Such a two layer authoring template approach can allow for separation of video authoring operations from video representation. For example, once multimedia content such as video has been authored (i.e., generated), the authored content may be simply and flexibly represented in one or more other forms (e.g., according to a user preference). An open and extensible multimedia authoring and sharing framework may support features such as dynamic updating of core components such as content analysis algorithms, editing methods, and the two-layer authoring templates. Such aspects can significantly reduce user efforts in video editing while preserving flexibility and personalization.

In this exemplary method, a second step includes finding appropriate content to feed into the slots of the selected template. Users may use the media data on their local machine, and may also use "search and browse" functionality on a web server (e.g., the browsing and searching module 142) to find shared media data on the server and then drag them into a particular slot on a UI. For the shared media data, the users may only see a thumbnail with metadata, and possibly a low-quality version whereby the viewing option may be implemented as to not affect the authoring process and result.

A third step of this exemplary method includes playing or previewing media (see, e.g., the block 146 of FIG. 1). Just before this step, an editing engine (e.g., embedded on a web server) may be used to automatically compose the editing result for a user according to the data that the user provides and the corresponding template the user select. After composing a timeline (which is typically a very rapid process (e.g., less than about 5 seconds)), a timeline player (e.g., block 146) plays the authored content (e.g., a content composition file). In this procedure, the server may request a low-quality version of the media data from the server or through an individual user's computer through P2P network (e.g., in either instance using scalable video streaming).

Accordingly, users may want to export or save the authored content into local machine or disc, etc. Thus, a rendering engine may request a higher quality version of the media data and compose a higher quality final result for the user. Users may also skip generation of the real video and decide to only save the description file and create the real content at a later time. The exported video or description file may also be shared on a server within or outside one or more communities. In addition, a description file may be output in a variety of other forms, such as a website, blog, streaming video file, DVD disc and so on.

Section 5: Demonstration Example

An example of an exemplary web-based media authoring framework follows. Of course, other arrangements and demonstrations are possible using various exemplary components described herein.

Figure 4:
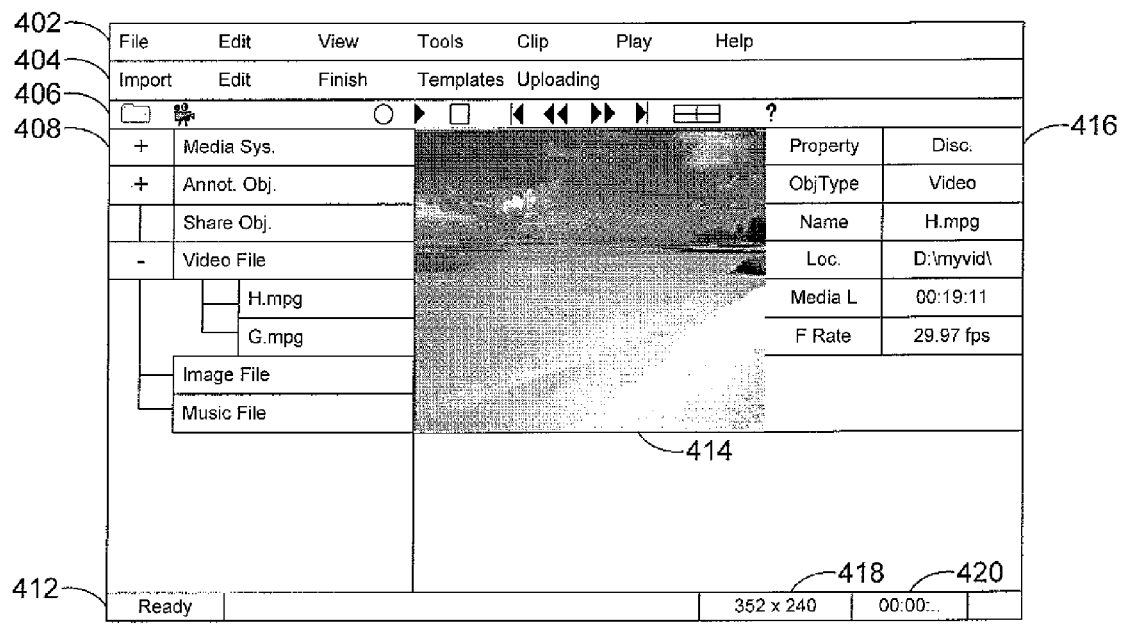
FIG. 4 is a diagram of an exemplary desktop client user interface and associated methods for use with an exemplary system.

FIG. 4 shows an exemplary main interface (UI) of a desktop client 400, which is suitable for tasks such as raw media content importing, content analysis metadata, media data uploading, and sharing permission control. While a typical media management system may have some of these feature, such a typical media management system generally does not include the uploading and sharing controlling functionalities exhibited by the exemplary main interface 400.

The exemplary UI 400 includes various task/tool bars 402, 404, 406. A file organization feature 408 provides for navigation of files (e.g., media, objects, etc.). Once a file, or data, is selected, a display region 414 displays the media content. Properties associated with the content in region 414 are displayed in a property display region 416, and optionally in other regions such as a size/resolution/quality region 418 and a timer region 420. Operational status may be displayed in an appropriate region such as the region 412.

To demonstrate this particular sub-system or component, importation occurs for a one-hour home video clip from a typical digital video camera (see, e.g., tool bar 404 "Import"). The exemplary system can do online content analysis when doing importing, and apply offline filters thereafter (see, e.g., the analysis module 114 of FIG. 2). Of course, a combination of importation and filtering is possible and may be implemented depending on circumstances if desired or appropriate. In this example, metadata is stored on a local library (see, e.g., the library desktop layer 120 of FIG. 1), which is the basis of browsing and searching functionalities on local machine (e.g., desktop client). In addition, a text description and/or other annotation can be added to the media content.

A user can then make a decision as to sharing using an exemplary sharing control (see, e.g., the control 123 of FIG. 1). For example, the user may decide to share three clips (around 3 minutes each) in low-resolution and low frame-rate on a community server (e.g., 80×60 frame size, 15 fps) with the metadata of the entire video. Next, a user may click a button "Uploading" (see, e.g., tool bar 404), whereby the metadata and the shared clips are uploaded into a community server (see, e.g., the community library layer 130 of FIG. 1).

Figure 5:
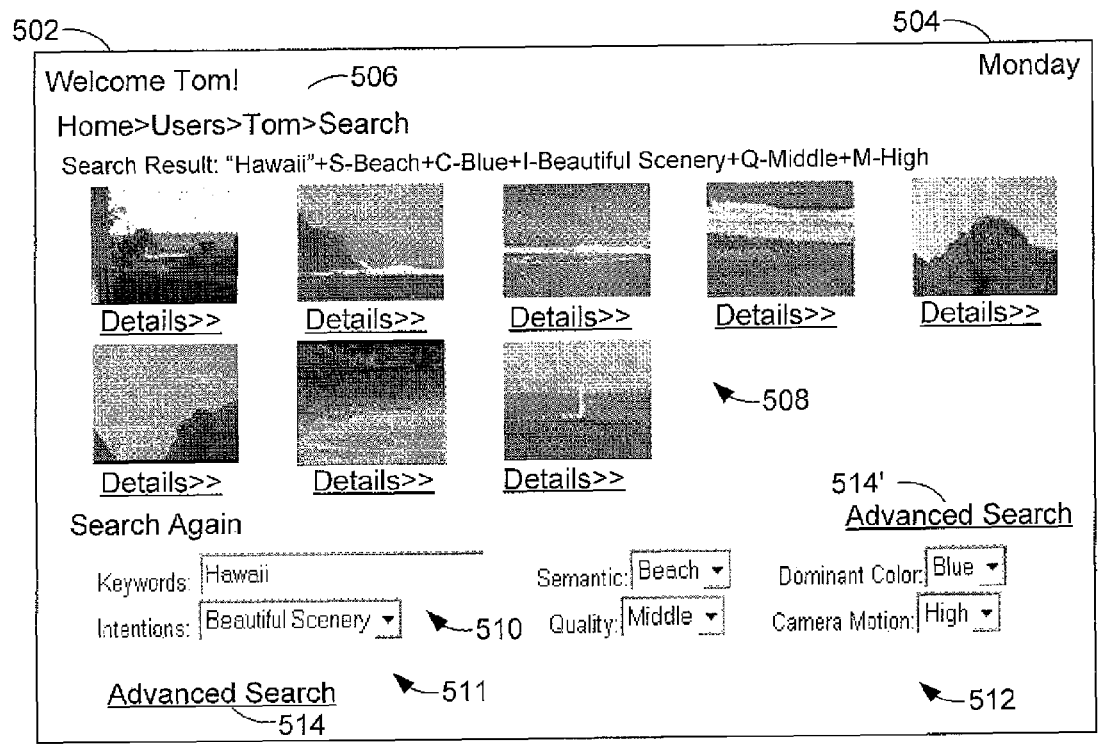
FIG. 5 is a diagram of an exemplary searching and browsing user interface and associated methods for use with an exemplary system.

FIG. 5 shows an exemplary browsing and searching user interface 500 that may be provided by a web server (see, e.g., the library web layer 130 of FIG. 1). In this example, the UI 500 includes a user identifier field 502, a day field 504, an organizational hierarchy/directory field 506, a search result display region 508 (e.g., to display low-quality content such as thumbnail images), a keyword search field 510, an intentions search field 511, various additional search fields 512 (e.g., semantic, quality, dominant color, camera motion, etc.), and one or more advanced search features 514, 514'.

The searching and browsing UI 500 may run independently, and also may run within an authoring process (e.g., as part of an authoring module). Consider searching one of the aforementioned shared clips by typing in a keyword specified to the clip before uploading, i.e., "Daughter Birthday" (see, e.g., keyword field 510). In response, the UI 500 may display a thumbnail of the clip along with various clip information (see, e.g., the region 508).

Such an exemplary searching facility may also use vaguer words to search desired content, for example, a user may choose "outdoor/beautiful scenery/dominant color: blue" (see, e.g., fields 511, 512). Upon selection of a particular file (e.g., thumbnail), the UI 500 may optionally display additional details or a details link may be selected to provide additional details (see, e.g., "Detail>>" of region 508).

Figure 6:
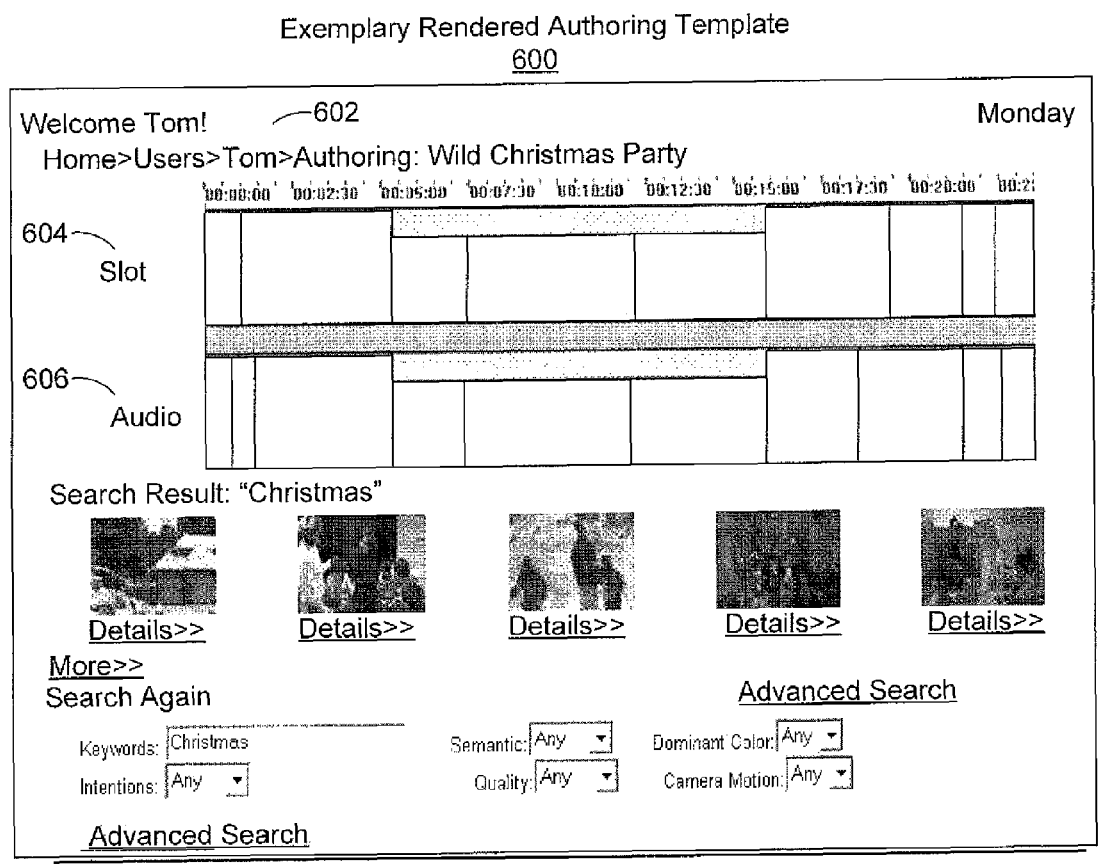
FIG. 6 is a diagram of an exemplary template and associated methods for use with an exemplary system.

To demonstrate how to author a video on the web using an exemplary system, consider FIG. 6, which shows an exemplary rendered authoring template 600. The template 600 includes a hierarchy/directory field 602, a slot field along with time distinctions 604 set adjacent an audio/music field 606. One or more features of the UI 500 may be included as well (e.g., search fields, display regions for content, etc.).

According to an exemplary method, a check occurs to see if one or more suitable templates exist in a library. Next, in this example, a template "CDT" is chosen called "Wild Christmas Party" (see field 602). Rendering may then occur on the UI, which can be a webpage.

Next, a user may right click (or initiate other action) on a lattice representing a tail chapter and on a popup window and then change duration of the tail chapter from 1 minute into 2 minutes, and the editing style from "Default" into "Slow Motion". The modified template can be saved (or saved as a separate one) in the template library.

A user or users may browse/search and drag related source video clips and photo collections from a library view area into one or more slots. For example, photos of Christmas parties over the world from other community users are put into the leader slot, and clips about preparation of Christmas Eve are dragged into chapter one. A user or users may also drag certain music pieces from music library into the music track of the timeline, for example, to replace default music specified by the original template.

An exporting or saving step may be used for exporting or saving an edited result. For example, consider export of the aforementioned description file into an actual video file in MPEG2 format. A user may select another form such as website type, and then export the result as a website. In general, such a process does not create video but rather, when a certain thumbnail on the webpage is clicked, the template player will locate the corresponding position in the description file, instantly compose the timeline, and then play the virtual video.

Section 6: Various Exemplary Technologies

As described herein, an exemplary system enables authoring and sharing personal media on the web. In various examples, an exemplary system includes the following exemplary components: scalable video coding, media content analysis and template-based media authoring. Such an exemplary media authoring component for authoring media on the web provides users a novel personal media sharing and authoring experience.

While various user interfaces are shown, others are possible. Further, an exemplary system may embed more intelligent media content analysis techniques, as well as provide more compelling authoring templates may further improve the efficiency of handling media data.

Various modules may be integrated with other web application features, such as those found in commercially available web applications. With respect to commercially available web applications, such applications include the MSN® network of Internet services (Microsoft Corp., Redmond, Wash.), GOOGLE® search engine application (Google Inc., Mountain View, Calif.), YAHOO® search engine (Yahoo! Inc., Sunnyvale, Calif.). Exemplary techniques disclosed herein may be implemented in conjunction with such applications to extend or replace features and/or services. For example, a home page displayed at www.msn.com offers access to a variety of features (e.g., searches, web communities, email, etc.). A category or sub-category may be added to this page which would make available (e.g., launch, etc.) an exemplary authoring template, an exemplary browsing or searching module, etc. A category or sub-category may make available a searching module that provides results (e.g., media-related metadata) in a mark-up language (e.g., XML, etc.).

Various exemplary modules may be optionally accessed through use of an Internet linked toolbar (e.g., a web application toolbar such as a toolbar associated with the MSN® network of Internet services).

In general, various exemplary methods may be implemented through use of hardware. For example, processor executable instructions in the form of software may be stored on one or more computer-readable media and implemented using a processor. An exemplary method may rely on hardware alone or a combination of hardware and software and/or firmware. Various exemplary components rely on algorithms to implement control logic (e.g., logical functions that operate alone, in conjunction with input information such as data or user inputs, etc.). An exemplary computing device (see below) optionally includes control logic for performing an exemplary method or a part thereof.

Section 7: Exemplary Computing Environment

Figure 7:
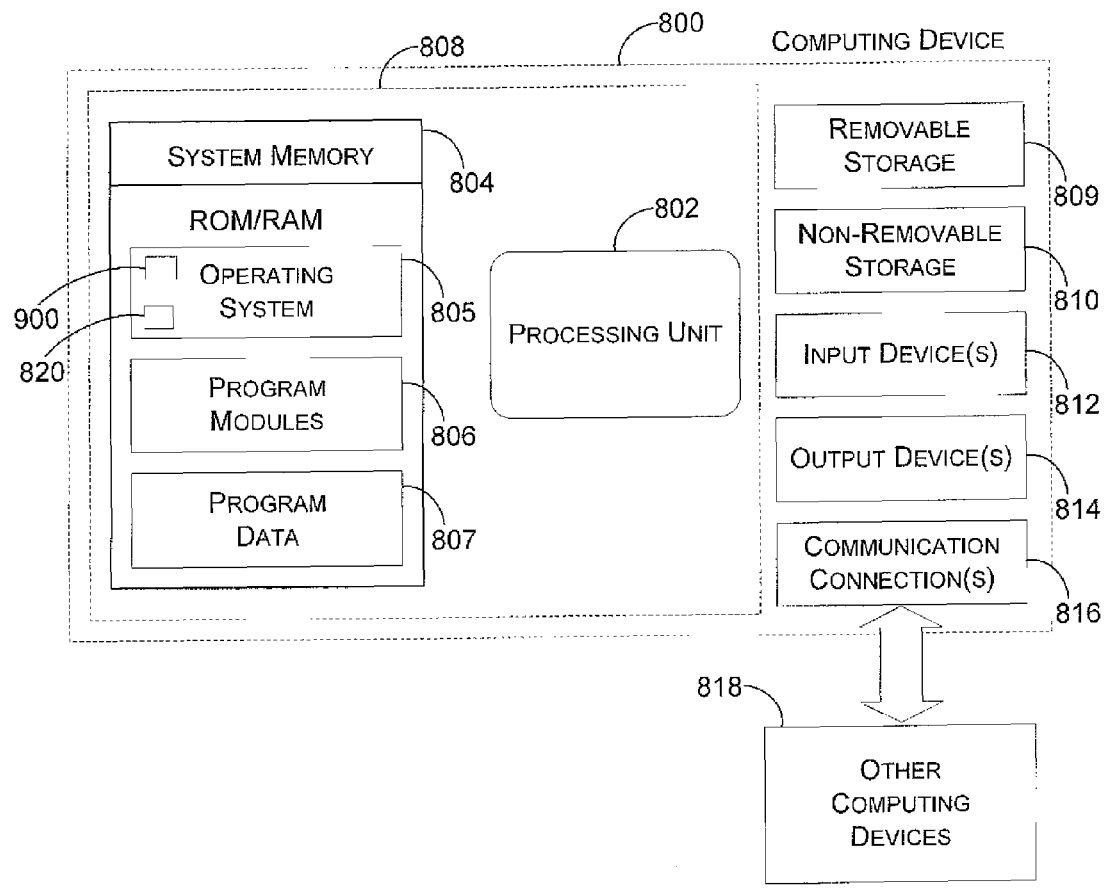
FIG. 7 is a block diagram of an exemplary computing device.

FIG. 7 illustrates an exemplary computing device 800 that may be used to implement various exemplary components and in forming an exemplary system. For example, the servers and clients of the system of FIG. 1 may include various features of the device 800.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. The operating system 806 include a component-based framework 820 that supports components (including properties and events), objects, inheritance, polymorphism, reflection, and provides an object-oriented component-based application programming interface (API), such as that of the .NET™ Framework manufactured by Microsoft Corporation, Redmond, Wash. The operating system 805 also includes an exemplary host framework 900, such as, but not limited to, the exemplary media framework. This very basic configuration is demarcated by a dashed line 808. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 7 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well know in the art and need not be discussed at length here.

Computing device 800 may also contain communication connections 816 that allow the device to communicate with other computing devices 818, such as over a network (e.g., consider the aforementioned web or Internet networks that may include one or more communities). Communication connections 816 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices storing computer-executable instructions that, when executed, cause one or more processors to perform acts comprising:
    acquiring digital video data by a client computing device;
    coding the digital video data using scalable video coding to generate scalable coded digital video data;
    storing the scalable coded digital video data to a sharable personal media library of the client computing device;
    receiving, by the client computing device, a request from a community web server for a lower-quality version of the scalable coded digital video data;
    uploading, via an internet, the lower-quality version of the scalable coded digital video data to a sharable web-based media library of the community web server in response to the request;
    generating, by the client computing device, information pertaining to the scalable coded digital video data, the generated information comprising metadata that includes video content information;
    storing the generated information in a metadata library of the client computing device;
    providing, by the client computing device, the generated information to a searchable, web-based metadata library of the community web server or another community web server to enable web access to the generated information, to enable web browsing of and web searching for the lower-quality version of the scalable coded digital video data in the sharable web-based media library;
    enabling web access to the generated information in the metadata library of the client computing device and the scalable coded digital video data in the sharable personal media library of the client computing device based in part on web browsing of or web access to the lower-quality version of the scalable coded digital video data in the sharable web-based media library; and
    setting permissions by the client computing device using a permission-based sharing control application executing at least in part on the client computing device, the permissions at least in part for:
        controlling modification of the generated information in the web-based metadata library of the web server and the metadata library of the client computing device by one or more web-based communities;

sharing the lower-quality version of the scalable coded digital video data in the sharable web-based media library; and sharing the scalable coded digital video data in the sharable personal media library of the client computing device.

2. The one or more computer-readable storage devices of claim 1, wherein the providing web access to the generated information comprises setting one or more video quality parameters.

3. The one or more computer-readable storage devices of claim 1, wherein the generated information pertaining to the scalable coded digital video data further comprises video quality information.

4. The one or more computer-readable storage devices of claim 1, the generated information being generated based in part on a use of at least one filter selected from a group consisting of shot detection, sub-shot detection, scene grouping, motion detection, key-frame extraction, color histogram, attention detection, quality assessment, correlegram, video signature, face detection, intention detection, semantic class, semantic annotation, keywords, and text description filters.

5. The one or more computer-readable storage devices of claim 1, the providing web access to the generated information provides web access to the generated information in an extensible mark-up language.

6. The one or more computer-readable storage devices of claim 1, wherein the digital video data comprises digital video data and digital audio data.

7. One or more computer-readable storage devices storing computer-executable instructions that, when executed by a client computing device, perform acts for sharing digital media data, the acts comprising:

acquiring the digital media data by the client computing device;

generating coded digital media data from the digital media data;

storing the coded digital media data to a sharable personal media library of the client computing device; and receiving, by the client computing device via an internet, a request from a community web server for a lower-quality version of the scalable coded digital video data;

uploading, via the internet, the lower-quality version of the coded digital media data to a sharable web-based media library of the community web server in response to the request;

analyzing, by the client computing device, the coded digital media data using one or more filters to generate metadata in an extensible mark-up language, the metadata pertaining to content of the coded digital media data;

uploading, via the internet, the metadata to a sharable and searchable, web-based metadata library of the community web server or a different community web server; and to enable web browsing of and web searching for the lower-quality version of the coded digital media data in the sharable web-based media library and the coded digital media data in the sharable personal media library, providing web access to the sharable and searchable, web-based metadata library via permissions set by the client computing device using a permission-based sharing control application, the permissions at least in part for:

controlling modification of the metadata by one or more web-based communities; and sharing the coded digital media image data in a predetermined quality in the sharable personal media library of the client computing device based in part on web browsing of or web access to the lower-quality version of the scalable coded digital video data in the sharable web-based media library.

8. One or more computer-readable storage devices storing computer-executable instructions that, when executed, cause one or more processors to perform acts comprising:

retrieving, from a community web server via a web, a set of semantic field entries associated with semantics of media, a set of quality field entries associated with quality of media, a set of camera motion field entries associated at least with a camera motion type of a camera used to record media and a set of intention field entries associated at least with an intention of a creator of media;

displaying to a display device at least a semantic field entry, a quality field entry, a camera motion field entry and an intention field entry from the respective sets;

receiving a command signal to indicate that a user has selected a semantic field entry, a quality field entry, a camera motion field entry and an intention field entry from the respective sets; and initiating a search for media on the web based in part on the semantic field entry, the quality field entry, the camera motion field entry and the intention field entry selected by the user, the media being stored in one or more personal media libraries of one or more client computing devices accessible via the web, wherein the search comprises searching a web-based metadata library of the community web server accessible according to permissions set by a permission-based sharing control application of at least one of the one or more client computing devices, the permissions at least in part for:

controlling modification of the media by one or more web-based communities; and sharing of media in the one or more personal media libraries of the one or more client computing devices that corresponds to metadata stored in the web-based metadata library by at least one of the one or more client computing devices.

9. The one or more computer-readable storage devices of claim 8, comprising further computer-executable instructions to perform acts including receiving search results in an extensible mark-up language.

10. The one or more computer-readable storage devices of claim 8, comprising further computer-executable instructions to perform acts including:

displaying a media authoring template for authoring media based on media retrieved from the web, for authoring media to be accessible via the web and/or for authoring media whereby metadata associated with the authored media being accessible via the web; and representing media that is authored as virtual media in a description file, wherein a template player locates a position in the description file corresponding to the virtual media to play the virtual media.

11. The one or more computer-readable storage devices of claim 1, the coding performed at least in part by applying multiple-loop prediction and drifting reduction techniques.

12. The one or more computer-readable storage devices of claim 1, wherein the lower-quality version comprises at least one of a lower resolution version or lower frame rate version.

13. The one or more computer-readable storage devices of claim 1, comprising further computer-executable instructions to perform acts including:

deriving, by analyzing the digital video data, a set of semantic field entries related to semantic classes;

deriving, by analyzing the digital video data, a set of quality field entries; and deriving, by analyzing the digital video data, a set of intention field entries.

14. The one or more computer-readable storage devices of claim 13, comprising further computer-executable instructions to perform acts including providing the set of semantic field entries, the set of quality field entries and the set of intention field entries to a web based service to provide a user interface to a client for searching the digital video data.

15. The one or more computer-readable storage devices of claim 7, the analyzing comprising use of at least one filter selected from a group consisting of image, onset, beat detection, tempo detection, repetitive detection, keyword, and text description filters.

16. The one or more computer-readable storage devices of claim 11, wherein the multiple-loop prediction and the drifting reduction techniques are applied at a macroblock level.

17. The one or more computer-readable storage devices of claim 11, the multiple-loop prediction and the drifting reduction techniques provide for bandwidth estimation.

* * * * *